United States Patent Office 2,917,407
Patented Dec. 15, 1959

2,917,407

CURING CONJUGATED DIOLEFIN POLYMER COATINGS

Angelo L. Cipriano, Midland, Harold A. Walters, Beaverton, and Gerald E. Clock, Midland, Mich., assignors to The Dow Chemical Company, Midland, Mich., a corporation of Delaware No Drawing. Application October 19, 1956
Serial No. 616,955

12 Claims. (Cl. 117—103)

This invention pertains to articles having a surface coating in the nature of an adherent film derived from waterbase latex compositions in which the binder is a colloidally dispersed polymer of an aliphatic conjugated diolefin. It particularly pertains to a method of making an improved surface coating on such articles by employing a water-base latex composition in which the binder is a colloidally dispersed polymer of an aliphatic conjugated diolefin and which contains a catalytic proportion of a drier metal catalyst, and subjecting the coating to a heat-treatment step.

The use of the so-called "water base" or "latex" paints as protective and/or decorative coating materials for plaster, masonry, concrete and like surfaces has become widespread. In this established art, a coating is obtained by applying a thin layer of a latex paint to a solid surface and drying that layer by evaporation of water. The latex coating compositions are colloidal dispersions usually comprising particles of a polymer of an aliphatic conjugated diolefin and, optionally, particles of solid pigment. In the dried film, the non-volatile ingredients of the latex composition are intimately held together, the diolefin polymer serving to bind the solid pigment particles, if any, to each other and to the solid base in an adherent, integral film.

In order to function satisfactorily as a binder, the polymer ingredient of the coating composition must have the property of forming a coherent film when the water is evaporated from a thin layer. In order to provide such cohesiveness and adhesiveness, it is necessary to employ soft polymers. For example, when the latex paint is compounded from a 1,3-butadiene-styrene copolymer latex, the polymer is usually one that contains at least 30 percent by weight of 1,3-butadiene and correspondingly not more than 70 percent of styrene since polymers that contain less than 30 percent by weight 1,3-butadiene are usually too hard to form satisfactory paint films.

In some instances, coatings obtained from latex paints containing 1,3-butadiene polymer latexes have been adversely criticized because the coatings are not sufficiently hard and are not sufficiently resistant to damage by contact with water and with organic liquids such as mineral spirits.

An object of this invention is to provide superior coatings from water-base coating compositions containing collodial dispersions of polymers of aliphatic conjugated diolefins.

Another object is to provide a method and compositions for obtaining such coatings.

A particular object is to provide, from water-base latex paints that contain colloidal dispersions of butadiene-styrene copolymers, strongly adherent coatings that are hard and resistant to damage by contact with water and with mineral spirits.

Other objects and advantages of the invention will be evident in the following description.

The objects of this invention have been attained by coating a solid surface with a thin layer of an aqueous coating composition comprising a colloidally dispersed polymer of an aliphatic conjugated diolefin and containing a catalytic amount of a drier metal compound, drying that coating by evaporation of water, and subjecting the dry coating to a heat-treatment step, all as more fully described hereinafter.

The aqueous coatings compositions are readily prepared from the so-called "latexes" of diolefin polymers, i.e. aqueous dispersions of colloidal particles of polymers obtained by polymerization of monomers dispersed as emulsions in aqueous media. Conjugated aliphatic diolefins from which such polymer dispersions are made include, for example, 1,3-butadiene, isoprene, chloroprene, 2,3 - dimethyl - 1,3 - butadiene, and piperylene. Usually, synthetic polymer latexes that are intended for use in latex paints are copolymers of one or more of such conjugated aliphatic diolefins and one or more other polymerizable mono - ethylenically unsaturated compounds that contain a single vinylidene, i.e. $CH_2=C<$, group in an aliphatic portion of the molecule. Examples of such vinylidene compounds are the alkenylaromatic compounds such as styrene, $\alpha$-methylstyrene, ar-methylstyrene, $\alpha$,ar - dimethylstyrene, ar,ar - dimethylstyrene, ethylstyrene, isopropylstyrene, chlorostyrene, dichlorostyrene, methoxystyrene, ethoxystyrene, and vinylnaphthalene, and ethylenically unsaturated acid derivatives, e.g. acrylonitrile, methacrylonitrile, methyl acrylate, methyl methacrylate, ethyl acrylate, ethyl methacrylate, butyl methacrylate and hexyl methacrylate, ethylenically unsaturated ethers, e.g. ethyl vinyl ether, ethylenically unsaturated ketones, e.g. vinyl methyl ketone and methyl isopropenyl ketone, ethylenically unsaturated esters, e.g. vinyl acetate, vinyl chloride, vinylidene chloride, and ethylenically unsaturated aliphatic hydrocarbons, e.g. isobutylene. Specific examples of copolymers whose aqueous colloidal dispersions are suitable for making water-base paints are the copolymers of styrene and butadiene; styrene and isoprene; styrene, butadiene and isobutylene; styrene, butadiene and vinyl chloride; styrene, butadiene and methyl isopropenyl ketone; styrene, butadiene and vinyl acetate; styrene, butadiene and methyl methacrylate; and butadiene and acrylonitrile.

Since the latexes prescribed for the present purposes are intended to provide the binder in the coating composition, which binder must secure the pigment and other solid particles to each other and to the coated base in a tough, adherent film, it is desirable that the aliphatic conjugated diolefin be at least 20, preferably from 30 to 60, percent by weight of the chemically combined monomers in the polymer. Polymers having less than 30 percent by weight of such diolefin are usually too hard and brittle and do not form cohesive films on air-drying the latex. Polymers having more than 60 percent by weight of such a diolefin are usually too tacky and too soft for satisfactory paints.

Methods for making aqueous colloidal polymer dispersions according to the known art usually involve making an aqueous emulsion of the selected monomers in a suitable aqueous medium containing emulsifying agents, protective colloids and catalysts for the polymerization, and subjecting that emulsion to moderate heat until the polymerization is substantially complete.

For some purposes, unpigmented latex coatings are desired, but in most instances it is necessary or desirable to incorporate solid pigments and/or fillers and coloring matter as in the preparation of water-base paints. For this purpose the materials and techniques commonly used in making latex paints can be employed. Pigments and other agents that are conventionally used in latex paints are suitable for the present purpose. Suitable solid pigments and extenders are titanium dioxide, lithopone, clays, magnesium silicates, silica, mica, barytes, iron oxides, sienna, umber, ultra-marine blue, cadmium pigments, chromic oxide, zinc chromate, carbon black, and phthalocyanine colors. Various organic dye colors can be used. In addition, those skilled in the art will want to add further agents such as dispersants, thickeners, defoamers, and bactericides. The coating compositions are usually compounded with the dispersed solids in total amount corresponding to not more than 60, preferably not more than 50, percent by volume of the whole composition. In pigmented compositions, the proportion of pigment solids is usually not more than 60, preferably not more than 45, percent by volume of all the non-volatile solids in the paint. Typical latex coating compositions contain from 15 to 50 percent by volume of total solids, of which total solids from 55 to 100 percent by volume are polymer solids and from 0 to 45 percent by volume are pigment solids. Paints having a low pigment-binder ratio usually form glossy coatings, while paints that have a high ratio of pigment to binder form flat, non-glossy coatings.

In accordance with the present invention, it is essential to incorporate in the latex coating composition a catalytic amount of a drier metal compound, such as a salt of cobalt, manganese, iron, or cerium, and to subject the coating to a heat-treatment step. Lead compounds are useful adjuncts to other drier compounds, particularly for cobalt compounds, but are not catalytically active per se. The drier metal compound is preferably a salt that is dispersible in the aqueous phase of the latex coating composition. Specific examples of water-soluble salts are cobalt (cobaltous or cobaltic) acetate, chloride, nitrate and sulfate; manganese acetate, chloride, nitrate and sulfate; iron (either ferrous or ferric) acetate, chloride, nitrate and sulfate; and cerium (ceric or cerous) acetate, chloride, nitrate and sulfate.

All of the metal salts just named are soluble and catalytically active in acidic latex coatings media. Some of these metal salts, such as those of cobalt and manganese, are also catalytically active in alkaline latex compositions. Ionic-iron salts precipitate insoluble iron hydrates in alkaline latex media and are not catalytically active in such instances.

The drier metals are advantageously employed as water-soluble salts of chelating agents such as ethylenediamine tetracetic acid (EDTA) and nitrilotriacetic acid. Water soluble chelate salts, e.g. of cobalt, manganese, iron and cerium, such as disodium cobaltous ethylenediamine tetracetate, are not only catalytically active in latex compositions at all pH values, but sequester the heavy metal in substantially non-ionized complexes, thereby obviating some of the risk of unstabilizing the latex dispersion by action of the heavy metal polyvalent ions when ionic salts are added. In some instances, the latex or latex paint is advantageously stabilized by addition thereto of a non-ionic stabilizer such as one of the polyglycol ether alcohol stabilizers in order to overcome a tendency of the heavy metal polyvalent ions to destabilize or coagulate the latex composition.

In place of the water-soluble salts of cobalt and manganese, there can be used the water-dispersible forms of the oil-soluble salts of these metals such as cobalt naphthenate and manganese naphthenate.

The proportion of drier metal that is advantageously incorporated in the latex composition depends at least in part on the temperature of the heat-treatment step as hereinafter described, but usually is in the range from approximately 0.05 to approximately 1.0, preferably from 0.05 to 0.5, percent by weight of metal based on the diolefin polymer in the latex coating composition. In general, lesser amounts of catalyst within the range stated are required when the heat-treatment is carried out at higher temperatures; conversely, larger amounts of catalyst are necessary when the heat-treatment step is carried out at lower temperatures.

The application of the metal-catalyzed latex coating composition to a solid surface is carried out in conventional ways, e.g. by brushing, spraying, rolling, or dipping, to provide a thin layer of the latex composition on the surface. The coating dries by evaporation of water, leaving a film of the diolefin polymer bound to the solid surface and occluding any non-volatile ingredients, e.g. pigments in the latex paint.

When first so deposited, coatings comprising diolefin polymer binders are not entirely satisfactory for many purposes as set forth hereinbefore. In accordance with the present invention an unexpected and advantageous improvement in the properties of coatings derived from the metal-catalyzed latex compositions is obtained by subjecting the coating to a heat-treatment step. The heat-treatment is carried out by heating the coating in air at elevated temperatures until the desired improvement in hardness and/or resistance to water and/or resistance to mineral spirits is attained. Typical baking schedules, for example, for compositions having from 0.1 to 0.2 percent by weight of catalytic metal (based on the weight of the polymer in the coating) is from 15 to 45 minutes at 250° F. to from 5 to 30 minutes at 350°–400° F., although longer or shorter baking times and/or higher or lower baking temperatures than those just cited may sometimes be used with advantage.

In order to obtain the kind and degree of improvement in properties of the coating in accordance with the method of this invention, it is essential that the coating composition comprise a polymer of an aliphatic conjugated diolefin and an effective proportion of a catalytic metal compound as described, and that the dry coating be subjected to a heat-treatment step. For instance, the results described herein have not been obtained with a coating that does not contain a diolefin polymer binder or with one that does not contain a catalytically active metal, and these results have not been obtained unless the coating is subjected to the prescribed heat treatment.

These facts support a hypothesis that the described process causes occurrence of a chemical change in the coating film involving the ethylenic unsaturation that initially exists in the molecules of the diolefin polymer, whereby the polymer molecules become three-dimensionally cross-linked. However, the invention does not depend on this or any other hypothesis.

The process has particular benefit and advantage in the preparation of factory finishes, i.e. the rapid and mass production of painted or coated articles in manufacturing plants. In such plants, it is desirable to provide finishes which attain their ultimate properties soon after application. For example, in factory production, it is desirable that the coatings become hard, tack-free and non-blocking soon after application in order that the coated articles can be packed and/or stacked in contact with each other for storage and shipping without damage to the finished surfaces.

The present process is of particular interest in the manufacture of wallboard, especially the so-called "hardboard." These articles are manufactured from bits of ground wood consolidated under heat and pressure (with or without the addition of natural or synthetic resin binders) in large, semi-rigid sheets for use in the construction of buildings and the like. The surface of these materials is often difficult to paint with oil-base paints and these do not dry fast enough for factory application. Conventional water-base paints containing diolefin polymers dry tack-free in a short-time, but remain too soft and easily damaged, and tend to block.

The present process provides a means for rapid application of factory finishes to hardboard, wallboard, paperboard, wood, asbestos-cement boards and shingles, metal and other articles. The finishes can be formulated as sealers, primers, and undercoats for oleoresinous paints, or as ultimate protective and decorative finishes per se.

The following examples illustrate the invention but are not to be construed as limiting its scope.

EXAMPLE 1

A series of non-pigmented latex formulations was compounded according to the following recipe.

| | Parts by wt. |
|---|---|
| Latex (hereinafter specified) | 100 |
| Methyl cellulose, 3 percent by weight solution in water | 8 |

The methyl cellulose was one whose 2 percent by weight solution in water had a viscosity of 15 centipoises at 20° C., and was added as a thickener, i.e. to give more body to the latexes for use as coating compositions.

The latexes used were aqueous colloidal dispersions of copolymers of 1,3-butadiene and styrene obtained by emulsion polymerization of mixtures of the corresponding monomers. The latexes had been stabilized by addition of non-ionic stabilizers to prevent coagulation by polyvalent heavy metal ions. The latexes employed are identified below by reference to the approximate percent by weight of the 1,3-butadiene and styrene in the copolymer, the approximate percent by weight of copolymer in the latex, and by the alkalinity or acidity of the latex.

| Latex | Copolymer | | Copolymer in Latex, percent | Remarks |
|---|---|---|---|---|
| | 1,3-Butadiene, percent | Styrene, percent | | |
| A | 20 | 80 | 45 | Alkaline. |
| B | 33 | 67 | 48 | Do. |
| C | 40 | 60 | 48 | Do. |
| D | 40 | 60 | 50 | Acidic. |
| E | 55 | 45 | 41 | Alkaline. |

To separate portions of each of these latexes there was added cobaltous acetate water solution in amount corresponding, respectively, to 0.3 and 1.0 percent by weight of cobaltous acetate, tetrahydrate, based on the polymer solids in the latex. Portions of the metal-containing latexes and of the non-catalyzed latex compositions were applied in a thin layer to separate test panels of pressed hardboard ("Masonite") and of asbestos-cement board. The coatings were applied to the hardboard at a rate of 3.5 pounds of dry solids per 1000 sq. ft. using a No. 22 Meyer rod, and to the asbestos-cement board at a rate of approximately 6.5 pounds of dry solids per 1000 sq. ft. using a brush. The coated panels were dried in air, after which some of the panels were baked in an air oven at a temperature of 300° F., some for 15 minutes and others for 30 minutes. In the case of the baked panels, a test for tackiness was made immediately upon removing the panel from the oven by pressing a cellulose tissue against the still-hot surface and qualitatively observing its stickiness.

After the panels were cool, blocking tests were run on the hardboard by cutting two 1" x 6" strips from the panels, placing the coated surfaces face to face, and applying a compression load of 28 pounds per square inch for five minutes at room temperature. The coatings were regarded as blocking if the panel pieces stuck together, and were regarded as non-blocking if the pieces were not stuck together. Blocking tests were not run on the asbestos-cement panels because these had rough, striated surfaces.

The resistance of the coatings to mineral spirits was measured by placing a few drops of a medium boiling, predominately aliphatic, liquid hydrocarbon mixture having a kauri-butanol number in the range from 34 to 38 on the coated panel at room temperature for 15 minutes. The excess mineral spirits was blotted off and the coating was examined for signs of swelling, softening or tackiness of the film.

The resistance of the coating to water was measured by immersing the 1" x 6" strips in water at room temperature for one hour and examining the coating for whitening or softening. In some instances the strips were immersed for 2.5 hours.

The results of these tests are shown in the following Tables I and II in which the coatings are identified by reference to the latexes A through E, respectively, described above, and to the amount of cobaltous acetate, tetrahydrate, therein, in percent by weight of cobaltous acetate based on the weight of polymer in the latex.

*Table I*

LATEX COATINGS ON HARDBOARD, BAKED AT 300° F.

| Latex | Cobaltous Acetate, 4H₂O, percent | Time of Bake, Minutes | Hot Tack | Blocking | Effect of— | |
|---|---|---|---|---|---|---|
| | | | | | Mineral Spirits | Water Immersion |
| A | none | 30 | slight | non-blocking | severe softening | whitened, very soft. |
| A | 0.3 | 15 | do | do | no effect | whitened, soft. |
| A | 0.3 | 30 | do | do | do | Do. |
| A | 1.0 | 15 | do | do | do | Do. |
| A | 1.0 | 30 | do | do | do | Do. |
| B | none | 30 | severe | blocked | severe softening | whitened, softened. |
| B | 0.3 | 15 | moderate | non-blocking | no effect | slightly whitened. |
| B | 0.3 | 30 | slight | do | do | no effect (2.5 hours). |
| B | 1.0 | 15 | do | do | do | Do. |
| B | 1.0 | 30 | do | do | do | no effect. |
| C | none | 30 | severe | blocked | severe softening | white and soft. |
| C | 1.0 | 15 | very slight | non-blocking | no effect | no effect (2.5 hours). |
| C | 1.0 | 30 | do | do | do | Do. |
| D | none | 30 | very tacky | blocked | severe softening | slightly white, slightly soft. |
| D | 0.3 | 15 | moderate | do | slight softening | no effect. |
| D | 0.3 | 30 | do | do | do | Do. |
| D | 1.0 | 15 | severe | do | do | slightly white, slightly soft. |
| D | 1.0 | 30 | moderate | non-blocking | no effect | no effect (2.5 hours). |
| E | none | 30 | severe | blocked | very severe; lifted | white and soft. |
| E | 1.0 | 15 | moderate | non-blocked | no effect | no effect. |
| E | 1.0 | 30 | do | do | do | Do. |

*Table II*

LATEX COATINGS ON ASBESTOS-CEMENT BOARD, BAKED AT 300° F.

| Latex | Cobaltous Acetate, 4H₂O, percent | Time of Bake, Minutes | Hot Tack | Effect of Mineral Spirits |
|---|---|---|---|---|
| A | none | 30 | moderate | severe softening. |
| A | 1 | 15 | do | no effect. |
| A | 1 | 30 | do | Do. |
| B | none | 30 | severe | severe softening. |
| B | 1 | 15 | moderate | no effect. |
| B | 1 | 30 | slight | Do. |
| C | none | 30 | severe | severe softening. |
| C | 1 | 15 | moderate | no effect. |
| C | 1 | 30 | very slight | Do. |
| D | none | 30 | severe | severe softening. |
| D | 1 | 15 | do | moderate softening. |
| D | 1 | 30 | moderate | no effect. |
| E | none | 30 | severe | very severe softening; lifted. |
| E | 1 | 15 | do | no effect. |
| E | 1 | 30 | slight | Do. |

EXAMPLE 2

The latexes identified in Example 1 as latexes B and C, respectively, were compounded by adding to 100 parts by weight of the latex 4 parts by weight of a 2.5 percent by weight solution of a methyl cellulose thickener (whose 2 percent by weight solution in water had a viscosity of 4000 centipoises at 20° C.). To separate portions of these latexes there was added cobaltous acetate, tetrahydrate (as a 10% by weight aqueous solution), in various amounts as set forth in the data below.

Portions of the several latex compositions were applied to one side of 6" x 6" panels of 0.25" tempered hardboard ("Masonite") using different Meyer rods to obtain various coating thicknesses, approximately as follows:

| Meyer rod: | Approximate weight of coating, pounds of dry polymer per 1,000 sq. ft. |
|---|---|
| No. 3 | 1.5 |
| No. 8 | 2 |
| No. 12 | 2.5 |
| No. 14 | 3.5 |
| No. 22 | 4 |

Immediately after coating, the panels were placed in an air oven at 300° F. After various baking times, the panels were removed from the oven. After cooling, the coatings were tested for blocking and for effect of mineral spirits and of water immersion by the methods described in Example 1. The results of these tests are summarized in the Table III. In the table, the amount of cobaltous acetate, tetrahydrate, is expressed as percent by weight thereof based on the solid polymer in the coating. The coating weights are pounds of dry coating per 1000 sq. ft. of surface.

Table III
LATEX COATINGS ON HARDBOARD, BAKED AT 300° F.

| Test | Latex | Cobaltous Acetate, 4H$_2$O | Coating Weight | Time of Bake, Minutes | Blocking | Effect of Mineral Spirits on Softening | Effect of Water Immersion (1.5 hours) | |
|---|---|---|---|---|---|---|---|---|
| | | | | | | | Whitening | Softening |
| 1 | B | none | 2.0 | 5 | blocked | severe | severe | severe. |
| 2 | B | 0.3 | 2.0 | 5 | slight | do | moderate | slight. |
| 3 | B | 0.3 | 2.0 | 10 | do | slight | do | Do. |
| 4 | B | 0.5 | 2.0 | 5 | none | severe | slight | very slight. |
| 5 | B | 0.5 | 2.0 | 10 | do | slight | do | Do. |
| 6 | C | none | 2.0 | 5 | blocked | severe | do | severe. |
| 7 | C | 0.1 | 2.0 | 5 | do | do | do | moderate. |
| 8 | C | 0.1 | 2.0 | 10 | do | do | do | Do. |
| 9 | C | 0.3 | 2.0 | 5 | do | do | do | Do. |
| 10 | C | 0.3 | 2.0 | 10 | do | do | do | Do. |
| 11 | C | 0.5 | 2.0 | 3 | do | do | moderate | Do. |
| 12 | C | 0.5 | 2.0 | 5 | none | moderate | slight | Do. |
| 13 | C | 0.5 | 2.0 | 10 | do | slight | none | none. |
| 14 | C | 1.0 | 2.0 | 3 | blocked | severe | moderate | moderate. |
| 15 | C | 1.0 | 2.0 | 5 | none | moderate | slight | Do. |
| 16 | C | 1.0 | 2.0 | 10 | do | none | none | none. |
| 17 | C | 1.0 | 2.0 | 15 | do | do | do | Do. |
| 18 | C | 1.0 | 1.5 | 15 | do | | | |
| 19 | C | 1.0 | 1.9 | 15 | do | | | |
| 20 | C | 1.0 | 2.3 | 15 | do | | | |
| 21 | C | 1.0 | 3.5 | 15 | do | | | |
| 22 | C | 1.0 | 4.3 | 15 | do | | | |

Strips cut from the panels of tests 18–22, inclusive, of this Example 2 were topcoated with oleoresinous finishes, some with varnish and some with an enamel. In each instance, the baked latex sealer or undercoater provided excellent holdout of and adhesion to the topcoat.

EXAMPLE 3

To separate portions of a latex of the kind identified as latex C in Example 1, i.e., an alkaline (ph 9.6) aqueous dispersion of approximately 48 percent by weight of a copolymer of approximately 40 percent by weight of 1,3-butadiene and 60 percent of styrene, there were added different drier catalyst metal salts of kinds and in amounts as shown in Table IV, the proportions being expressed as percent of the added metal salt based on the solid polymer in the latex.

These latex compositions were coated on clean automotive steel panels and were dried in air and baked at 275° F. for 30 minutes in an air oven. The cooled coated panels were tested in a manner described in Example 1 except that the resistance to mineral spirits was evaluated by immersing a portion of the panel in mineral spirits of the kind specified in Example 1 for times of 30 and 60 minutes. The water immersion test was for 48 and 80 hours. The test results are shown in Table IV.

Table IV
LATEX COATINGS ON STEEL, BAKED AT 275° F. FOR 30 MINUTES

| Test | Added Metal Compound | Hardness | Mineral Spirits Resistance | | Water Resistance | |
|---|---|---|---|---|---|---|
| | | | 30 mins. | 60 mins. | 48 hours | 80 hours |
| 1 | none | soft | fail | | poor | poor. |
| 2 | 0.2% cobaltous acetate, 4H$_2$O | hard | good | good | good | good. |
| 3 | 1.0% cobaltous acetate, 4H$_2$O | do | do | do | do | Do. |
| 4 | 0.2% ferrous sulfate, 4H$_2$O | do | fail | | poor | poor. |
| 5 | 1.0% ferrous sulfate, 4H$_2$O | do | good | good | fair | Do. |
| 6 | 0.2% ferric chloride, 6H$_2$O | do | do | do | poor | Do. |
| 7 | 1.0% ferric chloride, 6H$_2$O | do | | | fair | Do. |
| 8 | 0.2% manganese acetate, 4H$_2$O | do | good | good | good | good. |
| 9 | 1.0% manganese acetate, 4H$_2$O | do | do | do | do | Do. |
| 10 | 0.1% manganese naphthenate [1] | do | do | do | fair | poor. |
| 11 | 0.5% manganese naphthenate [1] | do | do | do | good | Do. |
| 12 | 0.2% lead acetate, 3H$_2$O | soft | fail | | poor | Do. |
| 13 | 0.1% lead acetate, 3H$_2$O | do | do | | do | Do. |

[1] Water-dispersible form.

EXAMPLE 4

To 50 parts by weight of a latex of the kind identified as latex C in Example 1, i.e. an alkaline (pH 9.6) aqueous dispersion of approximately 48 percent by weight of a copolymer of approximately 40 percent by weight of 1,3-butadiene and 60 percent of styrene, there was added 5 parts by weight of a 10 percent by weight water solution of the chelated iron salt, monohydrogen ferric ethylenediamine tetraacetate.

A portion of the iron-containing latex was made acidic by addition thereto of acetic acid to a pH value of 4.

Portions of each of the alkaline and acidic iron-containing latexes were separately coated on glass plates and the coatings were dried in air. The dry coated plates were baked in an air oven at 300° F. for 30 minutes. In each instance, the baked iron-containing films were much harder, more adherent to their bases, more resistant to damage by water, and more resistant to damage by mineral spirits than were either the unbaked films from the same latex or the baked films from uncatalyzed latexes.

EXAMPLE 5

To an alkaline (pH 8.0) latex dispersion of approximately 50 percent by weight of a copolymer of approximately 40 percent by weight of 1,3-butadiene and 60 percent of styrene there were added water solutions of cobaltous acetate and of manganese acetate in amounts corresponding to the proportions shown in Table V. The resulting metal-containing latexes were coated on separate test panels of clean automotive steel and were dried in air. The coated panels were baked in an air oven under conditions shown in the Table V.

The hardness of the coatings was measured by attempting to scratch the coating with the chisel-sharpened points of common lead pencils of various standard hardnesses. The value reported in each instance in Table V is that of the hardest pencil which the coating will resist without scraping the film from the base metal.

The resistance of the coatings to mineral spirits was qualitatively determined by examination of the coating after immersion for one hour at 25° C. in mineral spirits having a kauri-butanol value in the range of from 34 to 38. The resistance of the coatings to water was qualitatively determined by examination of the coating after immersion for 48 hours in water at 25° C.

These results are set forth in Table V, wherein the amount of the catalytic metal salt is expressed as percent by weight of the metal salt based on the solid polymer in the latex.

EXAMPLE 6

An iron oxide primer was prepared by first preparing a pigment grind by passing the following composition through a paint roll mill.

| | Pounds |
|---|---|
| Water | 103 |
| Pure red iron oxide | 69 |
| China clay | 69 |
| Barytes | 138 |
| Dispersing agent | 3 |

To the pigment grind there were added 588 pounds of an acidic latex dispersion of 46 percent by weight of a copolymer of approximately 40 percent by weight of 1,3-butadiene and approximately 60 percent by weight of styrene, 2.8 pounds of a non-ionic polyglycol ether alcohol stabilizer, and 11.0 pounds of a water solution of 10 percent by weight manganese acetate, tetrahydrate. The pH value of the resulting paint was adjusted to 5.5 by addition thereto of ammonium hydroxide.

An excellent primer coating on steel is obtained from this paint by applying a 2-mil dry film and baking at 275° F. for 30 minutes. The baked film has excellent adhesion, is easily sanded, has good enamel hold-out and resists the standard salt spray test for at least 340 hours.

EXAMPLE 7

An excellent black gloss enamel was prepared by blending 36 pounds of a 20 percent by weight aqueous dispersion of carbon black into 788 pounds of the latex described in Example 6 and adding 0.35 pound of cobalt in the form of a water-dispersible cobalt naphthenate, 18 pounds of a 3 percent by weight solution of a methyl cellulose (50 centipoise viscosity at 20° C. as 2 percent by weight solution), and 2 pounds of a water solution of 10 percent by weight citric acid. The pH was adjusted to 9.0 by addition of ammonium hydroxide. After coating on steel and drying for 15 minutes at room temperature, the enamel was baked for 30 minutes in an air oven at temperatures in the range from 300 to 320° F. to obtain a hard, glossy, smooth enamel finish that was resistant to damage by water or by mineral spirits.

We claim:

1. A method which comprises applying to a solid surface a thin layer of an aqueous latex coating composition which comprises a colloidally dispersed polymer of an aliphatic conjugated diolefin and a water-dispersible salt of a metal selected from the group consisting of manganese, iron, cobalt, and cerium, and heating that layer at temperatures in the range from 250° F. to 400° F. for at least three minutes.

2. A method according to claim 1 wherein the aliphatic conjugated diolefin is 1,3-butadiene.

3. A method according to claim 1 wherein the polymer is a copolymer containing from 20 to 60 percent by weight of polymerically combined 1,3-butadiene.

4. A method according to claim 1 wherein the polymer is a copolymer of from 30 to 60 percent by weight of 1,3-butadiene and correspondingly from 70 to 40 percent by weight of styrene polymerically combined.

5. A method according to claim 1 wherein the amount of metal in the form of the water-dispersible metal salt corresponds to at least 0.05 percent by weight of the polymer.

6. A method which comprises applying to a solid surface a thin layer of an aqueous latex coating composition which comprises a colloidally dispersed polymer of an aliphatic conjugated diolefin having from four to six carbon atoms and a water-dispersible salt of a metal selected from the group consisting of manganese, iron, cobalt, and cerium, the quantity of metal in the form of such salt being from 0.05 to 0.5 percent by weight of

Table V

| Test | Metal Catalyst | Baked at 250° F./30 mins. | | | Baked at 275° F./30 mins. | | | Baked at 350° F./15 mins. | | |
|---|---|---|---|---|---|---|---|---|---|---|
| | | Pencil Hardness | Resistance to— | | Pencil Hardness | Resistance to— | | Pencil Hardness | Resistance to— | |
| | | | Mineral Spirits | Water | | Mineral Spirits | Water | | Mineral Spirits | Water |
| 1 | None (control) | HB | Fail | Very poor | H | fail | Very poor | H | fail | fair. |
| 2 | 0.1% cobaltous acetate, 4H₂O | H | good | good | 2H | good | good | 4H | good | very good. |
| 3 | 0.2% cobaltous acetate, 4H₂O | H | ---do--- | ---do--- | 2H | ---do--- | ---do--- | 4H | ---do--- | Do. |
| 4 | 0.1% manganese acetate, 4H₂O | H | ---do--- | fair | 2H | ---do--- | ---do--- | 4H | ---do--- | Do. |
| 5 | 0.2% manganese acetate, 4H₂O | 2H | ---do--- | ---do--- | 2H | ---do--- | ---do--- | 4H | ---do--- | Do. | the diolefin polymer, drying that layer, and heating the dry layer at temperatures in the range from 250° F. to 400° F. for from 3 to 30 minutes to effect a substantial curing of the aliphatic conjugated diolefin polymer.

7. A method according to claim 6 wherein the polymer is a copolymer of from 30 to 60 percent by weight of 1,3-butadiene and correspondingly from 70 to 40 percent by weight of styrene.

8. A method of painting which comprises applying to a solid surface a thin layer of an aqueous latex paint, which paint comprises a colloidally dispersed solid pigment and a colloidally dispersed polymer, the total volume of the solid pigment and polymer being from 15 to 50 percent of the volume of the latex paint and the amount of the solid pigment being not more than 45 percent by volume of the total solids in the paint, the polymer being a copolymer of from 30 to 60 percent by weight of 1,3-butadiene and correspondingly from 70 to 40 percent by weight of styrene, which paint also comprises a water-dispersible salt of a metal selected from the group consisting of manganese, iron, cobalt and cerium, the amount of metal in the form of such salt being from 0.05 to 0.5 percent by weight of the polymer in the latex paint, drying the resulting paint layer, and heating the dry layer in air at temperatures in the range from 250° F. to 400° F. for from 3 to 30 minutes to effect a substantial curing of the butadiene polymer.

9. A coated article having an adherent surface coating comprising a heat-cured polymer of an aliphatic conjugated diolefin having from four to six carbon atoms, said coating having improved properties of hardness, resistance to mineral spirits, and resistance to water, which coating is obtained from a thin layer of an aqueous latex coating composition comprising a colloidally dispersed polymer of an aliphatic conjugated diolefin having from four to six carbon atoms and from 0.05 to 0.5 percent by weight based on such polymer of a metal selected from the group consisting of manganese, iron, cobalt, and cerium, such metal being in the form of a water-dispersible salt thereof, by drying that layer on the surface of the article and heating the dry layer at temperatures in the range from 250° F. to 400° F. for from 3 to 30 minutes.

10. A coated article having an adherent surface coating according to claim 9 wherein the polymer is a copolymer of 1,3-butadiene and styrene containing at least 20 percent by weight of 1,3-butadiene.

11. A coated article having an adherent coating according to claim 10 wherein the coating is obtained from a thin layer of an aqueous latex paint which comprises a finely divided solid pigment and the colloidally dispersed copolymer of 1,3-butadiene and styrene, the total volume of the solid pigment and copolymer being from 15 to 50 percent of the volume of the latex paint and the amount of solid pigment being not more than 45 percent by volume of the total solids in the paint.

12. A coated iron article having an adherent and protective paint coating comprising a heat-cured polymer of 1,3-butadiene, said coating having improved properties of hardness, resistance to mineral spirits, and resistance to water, which coating is obtained from a thin layer of an aqueous latex paint comprising finely divided solid pigment and a copolymer of 1,3-butadiene and styrene, which copolymer contains at least 20 percent by weight of 1,3-butadiene, and from 0.05 to 0.5 percent by weight based on such copolymer of a metal selected from the group consisting of manganese, iron, cobalt, and cerium, such metal being in the form of a water-dispersible salt thereof, the total volume of solid pigment and copolymer being from 15 to 50 percent by volume of the latex paint and the amount of pigment being not more than 45 percent by volume of the total solids in the paint, by drying that layer on the surface of the iron article and heating the dry layer at temperatures in the range from 250° F. to 400° F. for from 3 to 30 minutes.

References Cited in the file of this patent

UNITED STATES PATENTS

| | | |
|---|---|---|
| 2,540,996 | Ryden | Feb. 6, 1951 |
| 2,582,991 | Hempel | Jan. 22, 1952 |
| 2,605,242 | Betts et al. | July 29, 1952 |
| 2,649,425 | Hulse | Aug. 18, 1953 |
| 2,654,717 | Rehberg et al. | Oct. 6, 1953 |
| 2,725,981 | Abere et al. | Dec. 6, 1955 |

OTHER REFERENCES

"Organic Coating Technology," Payne, volume 1, 1954 (pp. 227–240 and 372–377 relied on).